United States Patent [19]

Murano

[11] Patent Number: 5,444,520
[45] Date of Patent: Aug. 22, 1995

[54] IMAGE DEVICES

[75] Inventor: Shunji Murano, Aira, Japan

[73] Assignee: Kyocera Corporation, Kyoto, Japan

[21] Appl. No.: 243,948

[22] Filed: May 17, 1994

[30] Foreign Application Priority Data

| May 17, 1993 | [JP] | Japan | 5-114321 |
|---|---|---|---|
| Jun. 8, 1993 | [JP] | Japan | 5-137177 |
| Jun. 8, 1993 | [JP] | Japan | 5-137181 |
| Jun. 25, 1993 | [JP] | Japan | 5-180616 |
| Jun. 28, 1993 | [JP] | Japan | 5-185649 |
| Jul. 26, 1993 | [JP] | Japan | 5-204650 |
| Jul. 28, 1993 | [JP] | Japan | 5-186199 |
| Aug. 31, 1993 | [JP] | Japan | 5-240523 |

[51] Int. Cl.$^6$ .................................. G03G 15/04
[52] U.S. Cl. .................... 355/229; 355/228; 355/67; 359/820; 347/244
[58] Field of Search .............. 355/228, 229, 237, 67; 346/107 R, 108; 359/820, 819, 838, 848, 846

[56] References Cited

U.S. PATENT DOCUMENTS

| 4,055,761 | 10/1977 | Shimomura | 359/513 X |
|---|---|---|---|
| 4,532,526 | 7/1985 | Behrens et al. | |
| 4,661,828 | 4/1987 | Miller, Jr. et al. | |
| 4,720,168 | 1/1988 | Kaneko | 359/820 |
| 4,815,059 | 3/1989 | Nakayama et al. | 369/45 |
| 4,829,321 | 5/1989 | Iizuka et al. | 346/107 R |
| 4,855,987 | 8/1989 | Versluis | 369/112 |
| 4,905,021 | 2/1990 | Iizuka et al. | 346/107 R |
| 5,023,442 | 6/1991 | Taniguchi et al. | |
| 5,210,650 | 5/1993 | O'Brien et al. | 359/820 |
| 5,270,869 | 12/1993 | O'Brien et al. | 359/820 |
| 5,313,333 | 5/1994 | O'Brien et al. | 359/819 X |

FOREIGN PATENT DOCUMENTS

| 0021706 | 2/1983 | Japan | 359/820 |
|---|---|---|---|
| 0162014 | 7/1986 | Japan | 359/820 |
| 0179420 | 8/1991 | Japan | 359/820 |

Primary Examiner—Matthew S. Smith
Attorney, Agent, or Firm—Spensley Horn Jubas & Lubitz

[57] ABSTRACT

In an image device wherein rays from LED arrays are guided through single lenses to form an image, LED arrays are arranged on a base plate, single lenses are arranged on a lens plate, the distance between the base plate and the lens plate is kept constant by using a spacer, and the coefficients of thermal expansion of the lens plate, base plate and spacer are made virtually identical to each other.

23 Claims, 13 Drawing Sheets

IMAGE DEVICES

FIELD OF THE INVENTION

The present invention relates to image devices such as optical print heads, image sensors, and in particular, image devices using single lenses.

PRIOR ART

Image devices which combine single lenses and light emitting element arrays such as LED arrays or EL arrays, or light receiving element arrays such as CCD arrays or photocell arrays are well known, and are used as print heads and image sensors. In such image devices, plurality of single lenses are fixed in a housing made of, for example, polycarbonate. Base plates made of alumina, glass, etc. are used to mount image arrays (light emitting element arrays or light receiving element arrays). Each single lens and each image array are in an one-to-one relationship. Light rays from each image array are made by a single lens to form an image on an image formation plane. Alternative incident rays are made by each single lens to form an image on each image array.

Image devices using single lenses, however, have not been put to practical use yet. The reason is that images are displaced relative to each other due to thermal expansion. In the case of a standard image device, the resolution is 300 DPI (dots/inch), and the dot interval on the image formation plane is 84.7 $\mu$m. The corresponding tolerance of the dot interval on the image formation plane is preferably within $\pm 10$ $\mu$m, and normally within $\pm 5$ $\mu$m. It is possible to assemble an image device so that the respective dots form an image within the above-mentioned tolerance at the temperature experienced during the assembly. The service temperature for image devices is not constant. The temperature varies due to the ambient air temperature variation, heat generated within the image device, or heat generated in a nearby photosensitive drum, etc. The temperature variation disturbs the positional precision of each single lens relative to the corresponding image array, causing a problem in joint portions between one lens and the next lens. For instance, in the case of LED heads, the dot interval within one LED array is constant, and the dot interval in an image formed by one single lens is also constant. However, when a temperature variation occurs, the relative position of the image array to the lens will change; the interval between two dots at the joint between one lens and the next lens will expand or contract. Such an expansion or contraction may produce a white or black streak in the image.

The inventor found that the cause of such a deterioration of the image quality was in the difference between the coefficient of thermal expansion of the housing and that of the base plate. For instance, the coefficient of linear thermal expansion of synthetic resins such as polycarbonate is about $1.9 \times 10^{-5}/°C$. On the other hand, the coefficient of linear thermal expansion of base plates made of alumina, glass, etc. is from $4.0 \times 10^{-6}$ to $7.5 \times 10^{-6}/°C$. For example, for a print head of 20 cm in length, the difference in coefficient of thermal expansion at $1.5 \times 10^{-5}/°C$. produces a positional error of $3 \times 10^{-3}$ cm (30 $\mu$m) at the center of the head for a temperature difference of 20° C. This difference corresponds to about 40 percent of the standard dot interval of an image device of 300 DPI.

SUMMARY OF THE INVENTION

One objective of the present invention is to reduce the degradation in the image formation performance due to temperature variation.

Another objective of the present invention is to facilitate positioning of the base plate relative to the spacer.

Another objective of the present invention is to integrally form the spacer and the lens plate so as to make the formation of such members easier.

Another objective of the present invention is to prevent stray light in the image device.

Another objective of the present invention is to facilitate the positioning of the single lens relative to the lens plate.

Another objective of the present invention is to reduce the incident angle of light to the image formation plane, and in turn, to improve the image formation performance.

Another objective of the present invention is to improve the precision of installing an image device on a photoconductor of the rear exposure system.

Another objective of the present invention is to change the resolution of the image device from that of the image array through contraction and magnification of images by single lens.

Another objective of the present invention is to have a greater distance between the image array and the image formation plane or the light source plane so as to improve the image formation performance.

Other objectives of the present invention will be clear from the embodiments and the drawings.

The image device of the present invention comprises plural image arrays, each having plural image elements linearly integrated, at least one oblong base plate having plural image arrays linearly arranged on said plate, at least one oblong lens plate having plurality of single lenses linearly arranged on said plate, and an oblong spacer for keeping a constant distance between the base plate and the lens plate, and the coefficient of thermal expansion of the base plate and that of the lens plate are arranged to be virtually the same with each other. The image arrays may be LED arrays, EL arrays, plasma arrays, CCD arrays, photocell arrays, etc. In the embodiments, an image device using LED arrays will be described.

Now, let us examine the thermal expansion in the directions of the rows of image arrays and of the lens arrays. The coefficient of thermal expansion of the image arrays differs from that of the lens arrays. These arrays, however, are small members of about several millimeters in length, and their thermal deformations are small. These members are also fixed on a base plate or a lens plate. So they tend to deform according to the thermal expansion of the base plate or the lens plate. The rates of their deformations, therefore, are different from the coefficients of thermal expansion of the image arrays and lens arrays themselves. Hence the coefficients of thermal expansion of the image arrays and of the lens arrays themselves are not important. What are important are the coefficients of thermal expansion of the base plates and of the lens plates. If they are different from each other, then the relative positions of the image arrays and the lens arrays will change to each other, resulting in a degraded image quality. The degradation in image quality will appear in the form of white or black streaks at the joint of two lenses. The image devices are normally oblong and have a length which corresponds to the width of a paper size such as A4, B4, etc. As the image devices are long, the effects of thermal expansion will increase even if the difference in their coefficients of thermal expansion is small. If the coefficients of thermal expansion of the base plate and of the lens plate are made virtually the same, the degradation in image quality due to temperature variation can be prevented or controlled. The temperature range to be considered is, for example, from −30° C. to 100° C. and more practically from the room temperature to 60° C.

It is preferable to make the coefficients of thermal expansion of the base plate, the lens plate and the spacer virtually same to each other. The minimum requirement, however, is make the coefficients of thermal expansion of the base plate and the lens plate virtually same to each other. For instance, it is acceptable that the coefficients of thermal expansion of the base plate and the lens plate are virtually the same, and the spacer has a different coefficient of thermal expansion. This will be explained in more detail with a case in which the image arrays are light emitting element arrays. When, for example, the coefficient of thermal expansion of the spacer is virtually zero, the distance between the image arrays and the lenses will not change even if the temperature varies. Then it will be sufficient to keep the distance between the lense and the image formation plane constant. If the coefficient of thermal expansion of the spacer is negative, it will generate an effect of compensating the variation in distance between the lens and the image formation plane. In this case, if the temperature rises, the distance between the image array and the lens will be reduced. For lenses, in general, when an object comes near to a lens, its image will move away from the lens, and when the object moves away from the lens, its image will come closer to the lens. When the image array comes closer to the lens due to a temperature rise, the position of the image formation plane will move away from the lens, fitting to the positional change of the image formation plane due to the temperature rise. As a result, the change in distance between the lens and the image formation plane due to temperature rise can be compensated.

Making the coefficients of thermal expansion of the base plate and the lens plate virtually same to each other means that their coefficients of thermal expansion are made same to each other so that no white streak or black streak appear in the image. According to the experience of the inventor, for an image device of resolution at 300 DPI, it is desirable to keep the difference in their coefficients of thermal expansion at $5\times10^{-6}/°C$. or under, and preferably at $3\times10^{-6}/°C$. or under. As described above, suppose an image device of 20 cm in length. Let us examine the relative positional change between a lens and an image array at the center of the device resulting from the difference between two coefficients of thermal expansion for a temperature variation of 20° C. at the center. If the difference in coefficient of thermal expansion is $5\times10^{-6}/°C$., the positional change will be 10 μm, which is nearly the tolerance. When the difference in coefficient of thermal expansion is $3\times10^{-6}/°C$., the change will be 6 μm, which is fairly smaller than the tolerance. Thus the empirical values for the difference in coefficient of thermal expansion, at $5\times10^{-6}/°C$. or under, or at $3\times10^{-6}/°C$. or under, almost correspond to the theoretical values based on the above-mentioned model. Concerning the spacer, making its coefficient of thermal expansion virtually same to those of the base plate and of the lens plate means that the differences between any two of the three members be kept at $5\times10^{-6}/°C$. or under, or at $3\times10^{-6}/°C$. or under. The actual range should be determined in such a way that no white streak or black streak appears in the image. The range of tolerance for the difference in coefficient of thermal expansion is inversely proportional to the resolution of the image device.

Liquid crystalline plastics are materials of which coefficients of thermal expansion are small and can be set at any desired level. One special feature of liquid crystalline plastics is that they can have a negative coefficient of thermal expansion. The coefficient of thermal expansion, for instance, can be set within a range from $-2\times10^{-6}/°C$. to $3\times10^{-6}/°C$. In this range, the coefficient of thermal expansion is small in value, and if the base plate has one limit and the lens plate has the other limit of the range, the difference in coefficient of thermal expansion will be small. The coefficient of thermal expansion of crystalline glass can be controlled by adjusting its materials, but its coefficient of thermal expansion can not be made negative.

These materials, however, are expensive. For practical purposes, it is desirable to make the base plates, lens plates and spacers of acrylic resin, methacrylate resin, polycarbonate resin, polyamide resin, polyacetal resin, epoxy resin, ABS resin, polyethylene-terephthalate resin, polybutylene-terephthalate resin, polyphenylene-oxide resin, polyphenylene-sulfide resin or poly-benzimidazole resin. They are synthetic resins known as engineering plastics. They have smaller coefficients of thermal expansion for synthetic resins. They have high heat resistance, and can be molded into any desired forms of spacers, lens plate and base plates.

Sets of image arrays, each set comprising a desired number of image array or arrays, are preferably arranged linearly at intervals on the base plate. Spacers are provided, along the longitudinal direction of the base plate, by a pair of side walls and light shielding plates. Ends of the side walls and of the light shielding plates end at the base plate. The side walls serve as spacers, facilitate positioning of the base plate, and protect the image arrays against external disturbances. The light shielding plates eliminate stray light, and correctly maintain the positions of the spacers and the base plate relative to each other. It is naturally desirable to give light shielding treatment to the interior surfaces of the side walls. The light shielding treatment, for instance, may be given by providing the surface of the shielding plate with concaves and convexes for scattering light in directions different from that of the optical path between said image array and said lens. The concaves and convexes may be the shape of saw teeth. Another way is to provide the surface of the shielding plate with a film wherein a pigment of the like, which absorbs the light used for the image array, is diffused. The material of the spacer itself may be one that absorbs light used for the image array; a pigment or the like may be diffused in the spacer itself.

The external surfaces of the spacers and the lens plate are preferably made conductive. It is intended to prevent penetration of external noises, and to prevent noises from being radiated from the image arrays. For making a conductive surface, a metallic tape may be stuck on the external surfaces of the spacers and the lens plate. A metallic film may be formed by electroless plating to form a conductive surface.

The lens plate and the spacers are preferably made of plastics, and they are formed integrally. As an alternative, the lens plate and the spacers may be formed separately. The side walls being spacers may end at both the longitudinal ends of the lens plate, and the light shielding plates may end at the main face of the lense plate on the base plate side. Integral molding is a technique for efficient production of the lens plate and spacers, and moreover it eliminates the need of positioning them.

The image array is preferably a light emitting element array such as LED array, and is provided with an optical-path-adjusting lens, which adjusts the optical path so that the incident angle of light from the lens to the image formation plane is made smaller. The optical-path-adjusting lens may be, for example, a cylindrical lens, a toric lens, or an array of minute lenses. The base plate is preferably transparent, and the image arrays are face-down-bonded on the main face thereof, which face is on the side opposite to the lens plate. Face down bonding is a technique for bonding a large number of image array pads at a time to the base plate.

When the image array is a light emitting element array, the image device may be located outside the photoconductor such as a photoconductor drum. To reduce the size of a printer, etc., however, it is desirable to locate the image device inside the photoconductor. In this case, it is desirable to keep a constant distance between the image device and the interior of the photoconductor by means of, for example, space rollers.

Using a single lens means rays from the image array (light emitting element array) may be expanded or contracted to form an image. This enables us to produce, for example, an image device of resolution at 600 DPI or at 800 DPI by contracting, to one half, the rays from an image array of resolution at 300 DPI or at 400 DPI. In this way, an image device of high resolution can be produced from inexpensive image arrays of lower resolution. Conversely, an image device of low resolution may be produced from general-purpose image arrays of intermediate resolution by, for example, magnifying two times the rays from an image array of resolution at 400 DPI. When a single lens is to be used, it is desirable to have a long optical path between the image array (light emitting element array) and the photoconductor. The greater the optical path length, the smaller the incident angle of rays to the photoconductor. This also means a smaller drop in image formation performance due to positional displacement. A mirror, therefore, may be provided to alter the optical path from the light emitting element array and increase the optical path length without making the image device larger.

When a half-mirror is used as a mirror, rays from plural base plates may be synthesized to form images on the same image formation plane. In this case, for instance, rays from one base plate are transmitted by the half-mirror, and the rays from the other base plate are reflected by the half-mirror. The optical path after the half-mirror is arranged accordingly.

EMBODIMENTS

Figure 1:
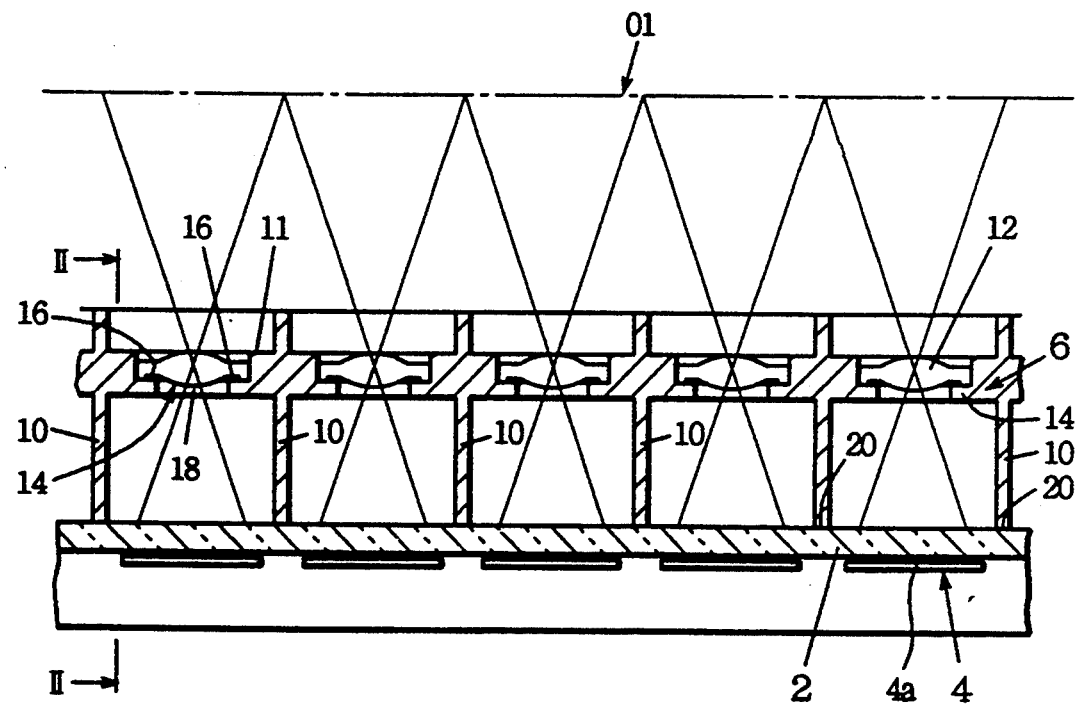
FIG. 1 is a sectional view of an essential portion of an embodiment of the image device according to the present invention.
Figure 2:
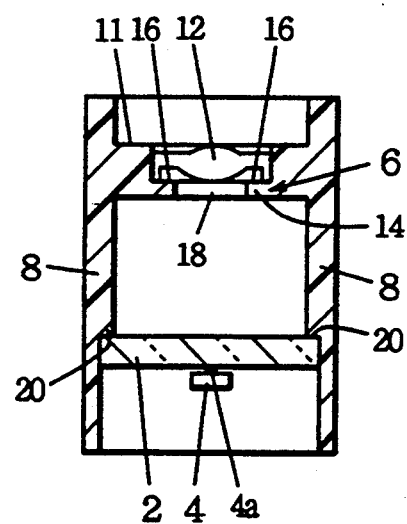
FIG. 2 is a sectional view of the embodiment of FIG. 1 along the line II—II.
Figure 3:
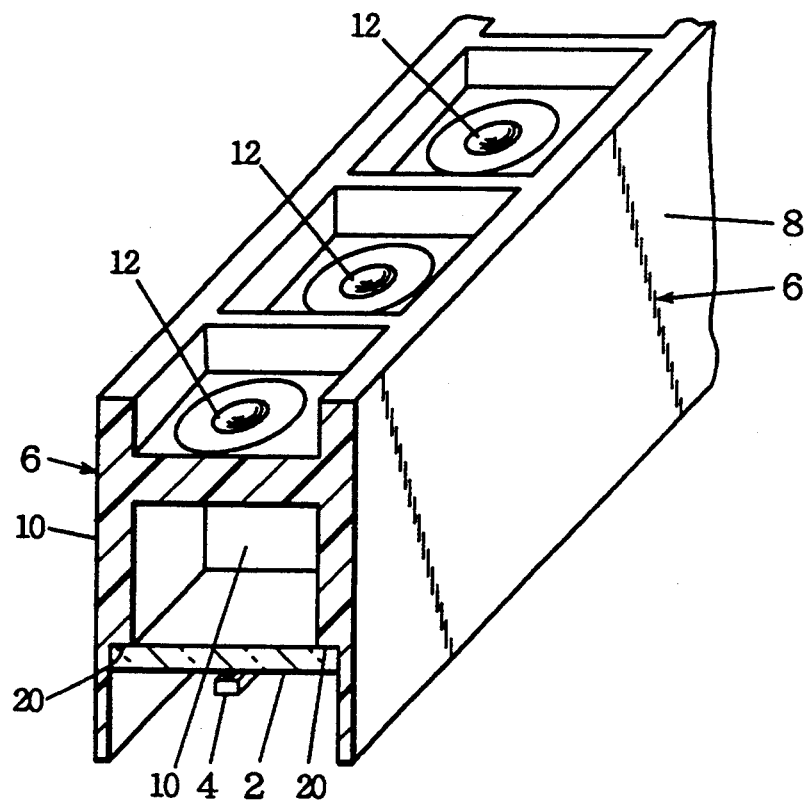
FIG. 3 is a perspective view of an essential portion of the embodiment of FIG. 1.

Preferable embodiments are shown in FIG. 1 through FIG. 13. They are LED heads. In FIG. 1 through FIG. 1, 2 denotes a base plate, 4 an LED array, 4a an individual LED, respectively 6 denotes a housing, 8 a side wall thereof, 10 a light shielding plate thereof, and 11 a lens plate. The side walls 8 and the light shielding plates 10 of the housing 6 serve as spacers to keep a constant distance between the base plate 2 and the lens plate 11. The lens plate 11 is a part of the housing 6. The side walls 8, shielding plates 10 and lens plate 11 are integrally molded. LED heads generally have a length corresponding to a paper size such as A4, B4, etc. The base plate 2 and the housing 6 are oblong. 01 denotes the image formation plane such as a photoconductor drum.

The external surfaces of the base plate 2 and of the side walls 8 are preferably made conductive to prevent external noises from penetration, and to prevent outward radiation of noises from LED arrays 4. The conductive surfaces are produced by, for example, sticking a metallic tape, forming a metallic film with electroless plating, over the surfaces of the base plate 2 and of the side walls 8, or by dispersing conductive materials such as carbon fiber in the base plate 2 and side walls 8.

12 denotes a single lens held in the lens plate 11. 14 is a lens holder of the lens plate 11. The lens holder 14 has a flange 16 for holding the circumference of the lens 12 and a hole 18 at the center of the flange 14. Rays are guided through the hole 18 into the lens 12 to form an image on the image formation plane 01. The single lens 12 may be a plastic lens such as acrylic resin or polycarbonate, or a glass lens. The circumference of the lens 12 is fixed to the flange 16 with an adhesive such as a resin. When the lens plate 11 is transparent, holes 18 are not needed at all. The lenses 12 are linearly fixed at a certain pitch on the lens plate 11.

The array 4 comprises plural LEDs 4a. All the LEDs 4a in one array 4 are selectively triggered to emit light by signals from driving ICs which will be explained later. The rays emitted are guided through the lens 12 to form an image on the image forming plane 01 such as a photoconductor drum and form a latent image. The LED 4a may be a light emitting diode such as GaAsP or GaP. For instance, for GaAsP LEDs, a substrate of GaAs is heated in a furnace to a high temperature, and a mixed gas of AsH3 (arsine), PH4 (phosphine) and Ga (gallium) is made to contact with the heated substrate. Thus single crystals of n-type semiconductor GaAsP (gallium-arsenic-phosphorous) are formed on the substrate. Next, a film with windows of Si3N4 (silicon nitride) is formed on the GaAsP single crystal surface. Zn (zinc) is diffused through the windows to form a P-type semiconductor. The resulting pn junction is used as a light emitting element of LED 4a.

The base plate 2 is transparent, and plural LED arrays 4 are linearly arranged on the lower surface thereof. The base plate 2 is the support member for LED arrays 4. A desired pattern of substrate wiring is formed on the surface of the base plate 2. The electrodes of arrays 4 are face-down-bonded (flip-chip-bonded) via solder bumps to the substrate wiring. All the electrodes of the arrays 4 can be bonded to the substrate wiring at a time; the connection between the arrays 4 and the substrate wiring can be made in a short time, with significant improvements in workability and productivity. For an LED head for the paper size B4, a total of 2048 LEDs 4a are needed. In practice, 32 arrays 4, each comprising 64 LEDs 4a, are linearly arranged. This makes an image device of resolution at 200 DPI for the paper size B4. For an image device for the paper size A4, with a resolution, for example, at 300 DPI, 40 arrays 4 are linearly arranged. The individual arrays 4 are linearly placed one by one with intervals. Single lenses 12 are used to form an enlarged image, forming a latent image without any gaps. Concerning the rate of magnification of the image, in the case of the above-mentioned image device of 200 DPI for B4, the resolution of the array 4 itself is 300 DPI. The image is magnified 1.5 times by the lens 12. Similarly, in the case of the image device of 300 DPI for A4, arrays 4 of resolution at 400 DPI are used, and the image is magnified 4/3 times by the lens 12. The array 4 and the lens 12 make one to one correspondence. The center of the array 4 is made to come to the center of the lens 12. A set of plural arrays 4 may be arranged to match one lens 12. In that case, the group of arrays 4, in which plural arrays are closely arranged in a line may be considered virtually as a single array.

20 is a contact surface. The side walls 8 and the shielding plates 10 end at the base plate 2 to position the base plate 2 relative to the housing 6. The side walls 8 end at both the longitudinal edges of the oblong base plate 2. The shielding plates 10 end at a gap between two arrays 4. The surfaces of the shielding plates 10 and the interior surfaces of the side walls 8 are coated with a pigment dispersed in an adhesive or the like, said pigment being designed to absorb stray light in the LED head. When the shielding plates 10 are provided, stray light of a neighbor array 4 is prevented from entering into the lens 12 to disturb the image. Furthermore, when the shielding plates 10 are used to prevent reflection of LED light, disturbance of the image by reflected light can be prevented.

Now, the issue of the coefficient of the thermal expansion will be explained. When the position of an LED array 4 and that of a single lens 12, both the LED array 4 and the lens 12 having one to one relationship with each other, are shifted relatively to each other, the image on the image formation plane 01 will be disturbed. For instance, two images from two adjoining lenses 12 may overlap with each other to produce a black streak. Or a gap may be produced between the two images, resulting in a white streak. Similarly, when the side walls 8 or the shielding plates 10 expand or contract, the images may overlap or the images may have a gap in between. According to the experience of the inventor, the tolerance for positional variations of the lens 12 and the array 4 due to thermal expansion is at most within ± several micrometers (for the resolution of 300 DPI).

Lenses 12 and arrays 4 are small items of several millimeters long. The absolute values of thermal expansion or contraction of lenses 12 and arrays 4 are very small in comparison with those of the oblong base plate 2 or the oblong lens plate 11. Moreover, the arrays 4 are fixed to the base plate 2 and the lenses 12 are fixed to the lens plate 11. The arrays 4 and the lenses 12 do not expand or contract by themselves according to their coefficients of thermal expansion. The problem, therefore, is the thermal expansion and contraction of the base plate 2 and of the lens plate 11. The most desirable countermeasure is to have the same and small value for both of them. The minimum countermeasure is to make their coefficients of thermal expansion virtually same to each other. The temperature range to be covered is, for example, from $-30°$ C. to $100°$ C., and more practically, from the room temperature to $60°$ C.

In the embodiment, the lens plate 11, the side walls 8 and the shielding plates are integral. So the coefficient of thermal expansion of the housing 6 and that of the base plate 2 are made virtually identical to each other. For instance, the difference between them is kept at $5 \times 10^{-6}/°C$. or under, and more preferably at $3 \times 10^{-6}/°C$. or under.

Preferred materials for the housing 6 and the base plate 2 include 1) liquid crystalline polymer resins,
2) engineering plastics such as acrylic resin and polycarbonate, and
3) glasses of which coefficient of thermal expansion can be easily controlled, such as crystalline glass. Liquid crystalline plastics can have a negative coefficient of thermal expansion. Their coefficient of thermal expansion may be set, for example, in a range from $-2 \times 10^{-6}/°C$. to $3 \times 10^{-6}/°C$. Within this range, the coefficient of thermal expansion itself is small, and there is no need of making the coefficients of thermal expansion of the base plate 2 and of the housing 6 identical to each other. The housing 6 is preferably made of a liquid crystalline polymer resin reinforced with carbon fiber; the housing 6 is strong and black. Liquid crystalline polymer resins have a property that they are oriented in the direction of injection when injection-molded. Moreover, when carbon fiber or the like is mixed in the resins, the resins will be oriented in the direction of orientation of the fiber. The fiber will be oriented in the direction of injection. The liquid crystalline polymer resins have an extremely small coefficient of thermal expansion in the direction of orientation. The coefficient may be reduced, as described above, to a range from $-2\times 10^{-6}/°C$. to $3\times 10^{31}$ 6/°C. Liquid crystalline polymer resins, however, are expensive. Hence it is practical to use engineering plastics such as acrylic resin, methacrylate resin, polycarbonate resin, polyamide resin, polyacetal resin, epoxy resin, ABS resin, polyethylene-terephthalate resin, polybutylene-terephthalate resin, polyphenylene-oxide resin, polyphenylene-sulfide resin or polybenzimidazole resin. Such synthetic resins have relatively small coefficients of thermal expansion, are highly resistant to heat and can be easily molded to form the housing 6 having a complicated configuration. When engineering plastics are used, the difference between the coefficient of thermal expansion of the base plate 2 and that of the housing 6 should be, for example, at $5\times 10^{-6}/°C$. or under, and preferably at $3\times 10^{-6}/°C$. or under. The base plate 2 and the housing 6 may be of different materials. The coefficient of thermal expansion of an engineering plastic depends on the degree of orientation, the degree of crystallinity, the degree of polymerization, etc., and can not be determined by the kind of polymer alone.

Figure 7:
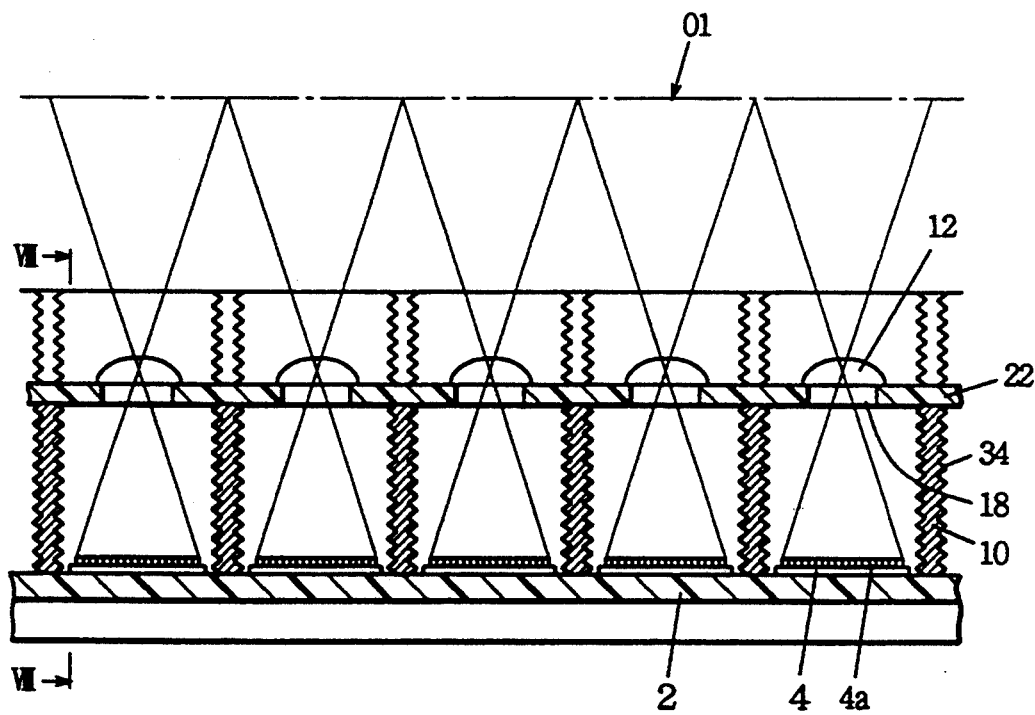
FIG. 7 is a sectional view of an essential portion of an embodiment with reflection prevention treatment.

Crystalline glass is a material of which coefficient of thermal expansion can be easily controlled. Its coefficient of thermal expansion may be reduced to virtually zero. It is not easy to form the housing 6 of glass. The base plate 2 may be made of crystallized glass which has a high strength. The housing 6 may be made of a liquid crystalline polymer reinforced with carbon fiber. Or when the lens plate 11 and the spacers are made separately as shown in FIG. 7, it is desirable to make the base plate 2 and the lens plate 11 of crystalline glass.

Modification 1

Figure 4:
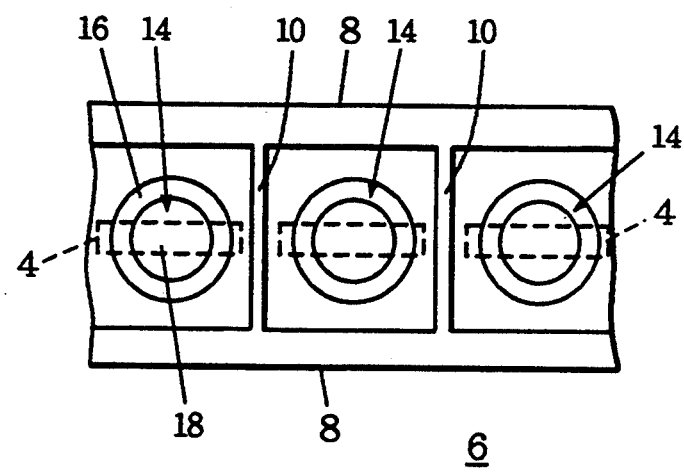
FIG. 4 is a plan view of an essential portion of the embodiment of FIG. 1 with the single lenses being removed.
Figure 5:
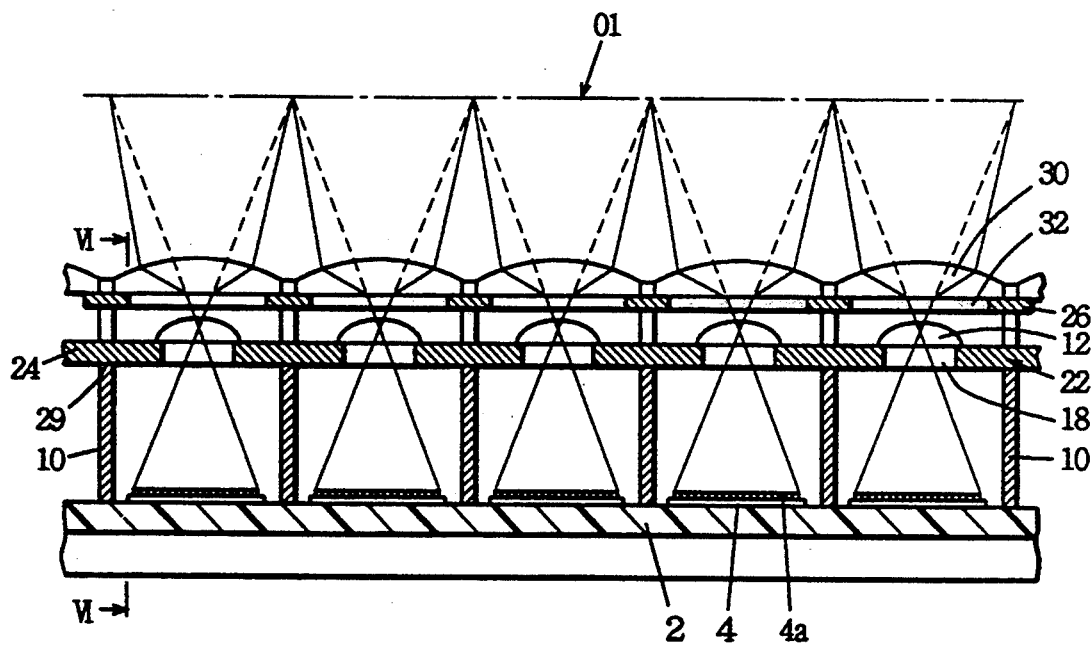
FIG. 5 is a sectional view of an essential portion of an embodiment with toric lenses.
Figure 6:
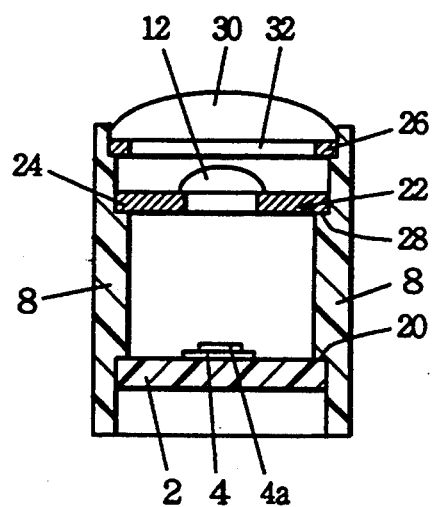
FIG. 6 is a sectional view of the embodiment of FIG. 5 along the line VI—VI.

FIG. 5 and FIG. 6 show an embodiment wherein a lens plate 22 is made separately from side walls 8, etc., and toric lenses 30 are provided for adjusting optical path. In these diagrams, 24 denotes a lens holder, 26 a toric lens array, 28 and 29 contact faces, 32 a hole beneath the toric lens 30. Other aspects than those specially mentioned here are similar to those of the embodiment of FIG. 1 through FIG. 4. In the present embodiment, LED arrays 4 are wire-bonded rather than face-down-bonded. It, therefore, is possible to use an opaque material for the base plate 2. In the embodiment, the lens plate 22, the side walls 8, and the shielding plates 10 are all made separately from each other. The coefficient of thermal expansion of the lens plate 2 and that of the lens plate 22 are made virtually same or identical to each other. A liquid crystalline polymer, being reinforced with carbon fiber, etc., may be used to form the side walls 8 and the light shielding plates 10 so that their coefficients of thermal expansion should be made zero or negative.

When the coefficients of thermal expansion of the side walls 8 and of the shielding plates 10 are made zero, a temperature variation will not change the distance between the LED array 4 and the lens 12; the disturbance of the image due to the variation in the distance between the lens 12 and the array 4 will be small. When the coefficients of thermal expansion of the side walls 8 and of the shielding plates 10 are made negative, the increase in distance between the lens 12 and the image formation plane 01 with the rise in temperature can be compensated. When the temperature rises, the distance between the LED array 4 and the lens 12 will decrease, and the distance between the lens 12 and the image formation plane 01 will increase. For the lens 12, these positional changes, namely, the movement of the array 4 towards the lens 12 and the movement of the image formation plane 01 away from the lens 12, result in a smaller deterioration in image making performance.

The toric lens 30, as shown in FIG. 5, makes the optical paths of the refracted rays more parallel and reduces the incident angle of the rays to the image formation plane 01. When the incident angle is reduced, the overlap of images or the gap between images formed with each lens 12 will be smaller even if the distance between the LED head and the image formation plane 01 varies with the temperature variation. In place of the toric lens 30, an array of micro convex lenses or a cylindrical lens may be used. Any lens are usable as far as it makes the optical paths of refracted rays more parallel to each other.

Modification 2

Figure 8:
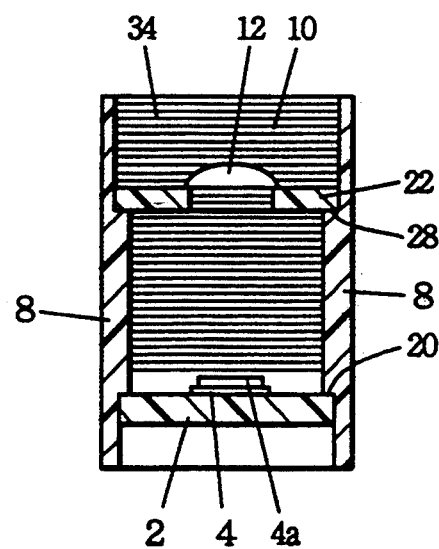
FIG. 8 is a sectional view of the embodiment of FIG. 7 along the line VIII—VIII.

FIG. 7 and FIG. 8 show an embodiment in which the shielding plates 10 are provided with anti-reflection faces 34. The anti-reflection face 34 comprises sew-teeth-shaped roughness. It scatters the incident rays from the array 4 downwards, preventing them from reaching the lens 12. The anti-reflection faces 34 can be formed by means of a mold when the shielding plate 10 is molded. Unlike the case of coating with pigment, all parts are free of any unwanted pigment.

Modification 3

Figure 9:
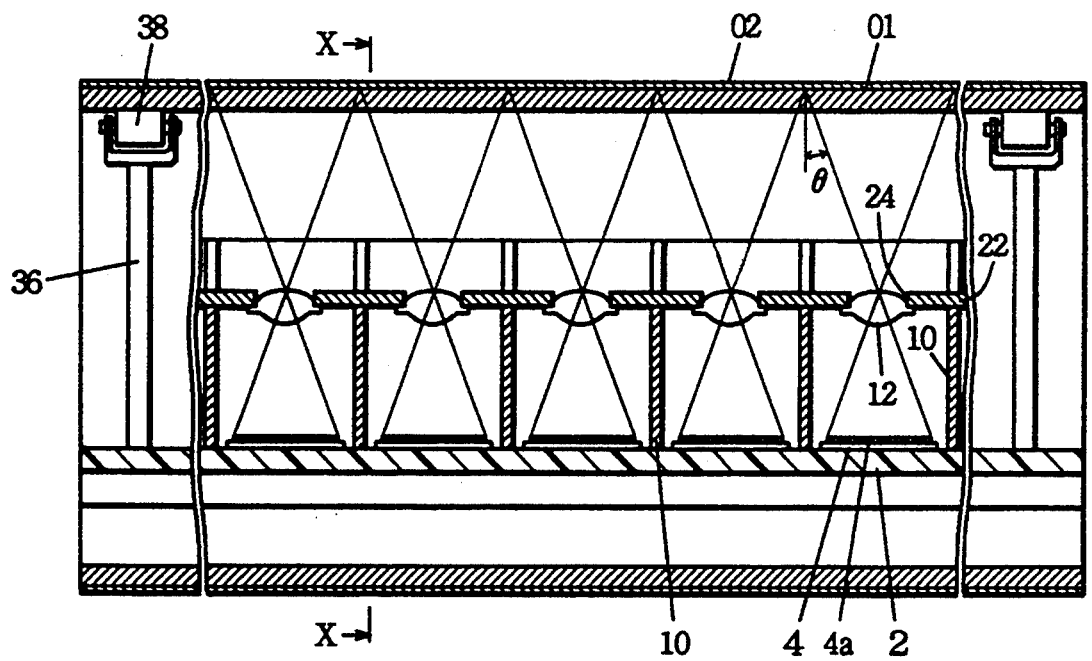
FIG. 9 is a sectional view of an essential portion of an embodiment used for a rear exposure application.
Figure 10:
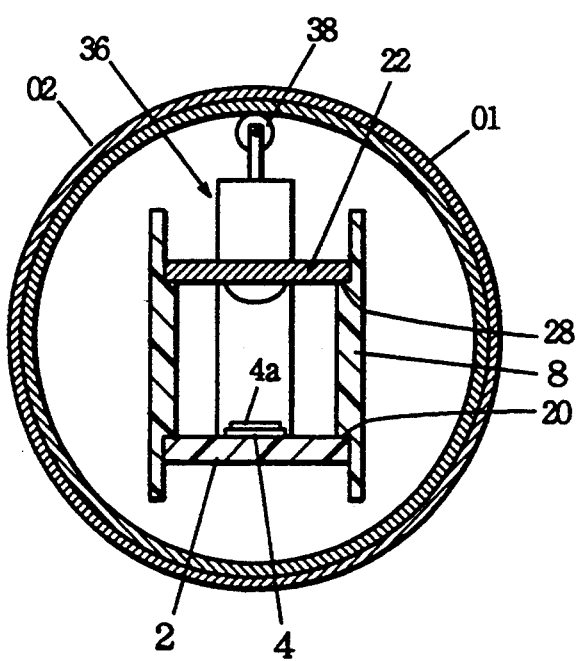
FIG. 10 is a sectional view of the embodiment of FIG. 9 along the line X—X.

FIG. 9 and FIG. 10 show an embodiment in which an LED head is stored inside a photoconductor drum 02, and the LED head is driven by the rear exposure method. In these diagrams, 36 denotes an arm, and 38 a roller. A pair of the arm and the roller is provided on each longitudinal end of the head to keep a constant distance between the head and the internal surface of the drum 02. In place of arms 36 and rollers 38, any members will do as far as they can keep a constant distance between the head and the internal surface of the drum 02.

Substrate Wiring

Figure 11:
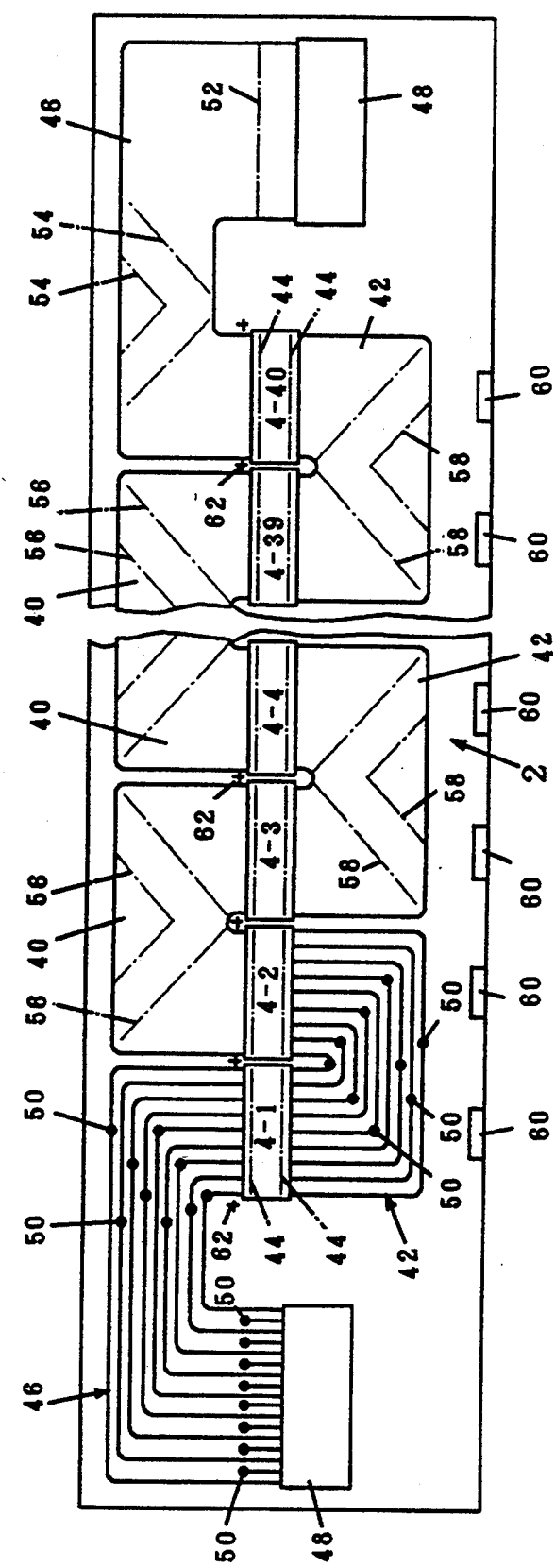
FIG. 11 is a plan view illustrating the first layer wiring of each embodiment.
Figure 12:
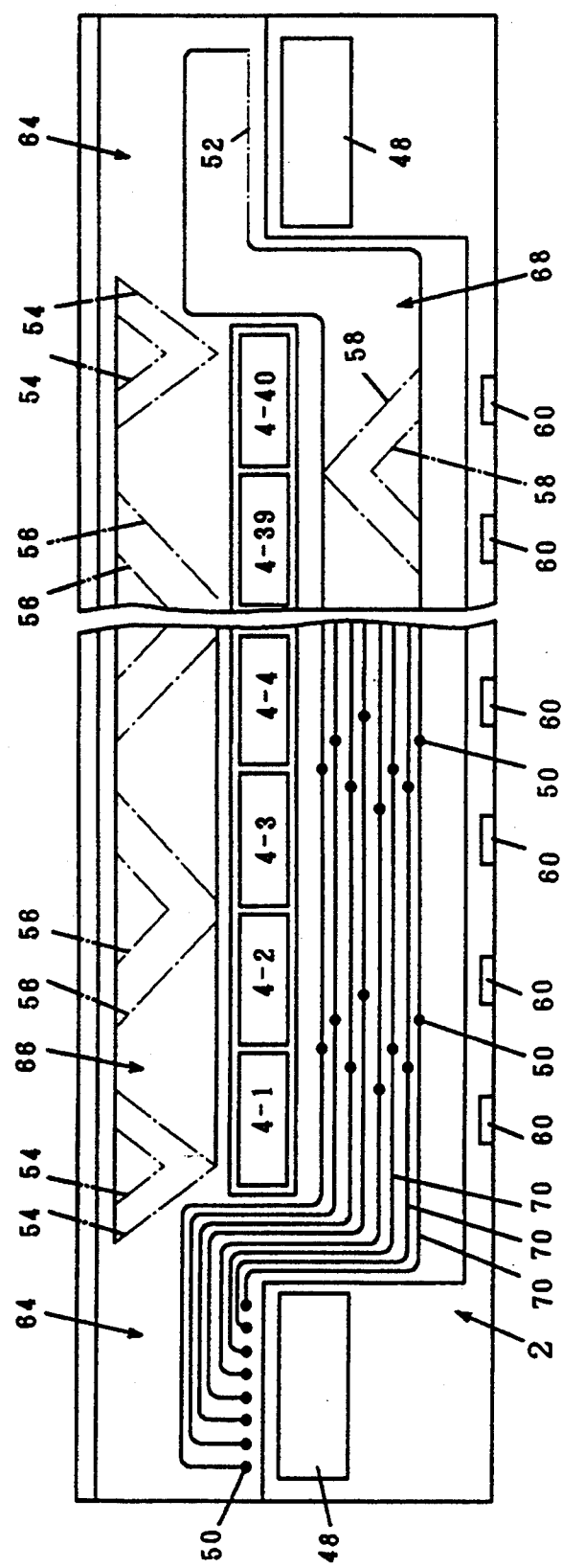
FIG. 12 is a plan view illustrating the second layer wiring of each embodiment.
Figure 13:
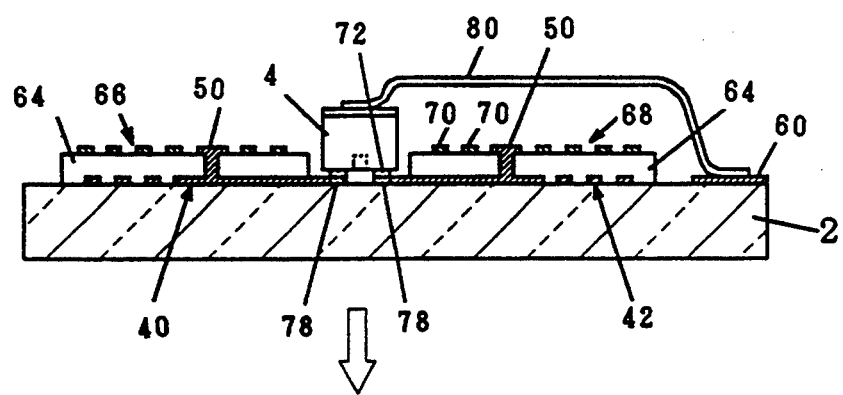
FIG. 13 is a sectional view showing the connection between the first layer wiring and the second layer wiring of each embodiment.

FIG. 11 through FIG. 13 show a two-layer wiring on a base plate 2 using an insulation film 64. FIG. 11 shows the state of the wiring without the insulation film 64. FIG. 12 shows the state with the insulation film 64. FIG. 13 shows the section of an image device. They are for the embodiment of FIG. 1 through FIG. 4, but when the face down bonding is replaced by wire boding, they are applicable to the respective modifications of FIG. 5 through FIG. 10.

On the first main face of the base plate 2, arrays 4-1 through 4-40 are linearly arranged. The image device has a resolution at 300 DPI for the paper size A4. The pitch of LEDs in the arrays 4-1 through 4-40 is 84.7 $\mu$m. The number of LEDs per array is 64. On the first main face of a transparent base plate 2, two sets of substrate wiring 40, 42 are provided. The first substrate wiring 40 is placed above the row of arrays 4 as seen in the diagrams. The second substrate wiring 42 is located beneath the row of arrays 4 as seen in the diagrams. In the embodiment, time-sharing driving is made, with array 4 as a unit. Hence the total number of wires of the substrate wiring is 64. It is divided into two halves; the first substrate wiring 40 has 32 individual wires and the second substrate wiring 42 has 32 wires, respectively. 44 is a row of bumps flip-chip-bonded; bumps provided on the substrate wirings 40, 42 are flip-chip-bonded to the electrode bumps of the arrays 4-1 through 4-40.

46, 46 are substrate wiring lead portions provided on both sides of the transparent base plate 2, each comprising 64 individual wires. 48, 48 are drive ICs. The substrate wirings 40, 42 of the embodiment are characterized that they are divided every two LED arrays. For instance, the substrate wiring 40 is provided every two LED arrays, and ends at the row of bumps 44. It is divided every two LED arrays. The same applies to the substrate wiring 43, and it ends at the row of bumps 44. Fragments of the divided substrate wirings 40, 42 are mutually connected by utilizing the through holes 50 and the second layer wiring on the insulation film shown in FIG. 12. It is hard to make through holes 50 in the glassy base plate 2, but it is easy to make through holes in an insulation film. The substrate wiring lead portion 46 has a through hole row 52 having 32 through holes 50. This row 52 is connected, via the second layer wiring on the insulation film, to 32 through holes 50 (they are called the through hole row 58). Similarly the substrate wiring lead portion 46 is provided with a through hole row 54 comprising 32 through holes 50. The through hole row 54 is connected, via the second layer wiring on the insulation film, to the through hole row 56 of the substrate wiring 40. The number of through holes in the through hole row 56 is 32. As the through hole requires a large wiring area, through hole rows 56, 58 are preferably arranged into plural rows, and more preferably arranged slantwise to the directions of the substrate wirings 40, 42. For instance, each through hole, if the gaps between it and adjacent wires are included, requires a wiring width of about 0.5 mm. In the embodiment, the through hole rows 56, 58 are two rows each, and they are bent at the center so that there are actually four rows each. The through hole rows 56, 58 are skewed by about 45 degrees to the directions of the substrate wirings 40, 42. 60 denotes the common electrode terminal to be connected via clip terminal 80 to the common electrodes of arrays 4-1 through 4-40. 62 is the marker for determining the position of the arrays 4-1 through 4-40, and is formed when the substrate wirings 40, 42 are formed.

FIG. 12 shows the state of the base plate 2 with the insulation film 64. The insulation film 64 may be made of for example, a photosensitive resin. The insulation film 64, from which the portions for through holes 50 and the portions around the arrays 4-1 through 4-40 are eliminated, is made by photolithography. The through holes 50 are made conductive. The use of a photosensitive resin allows easy formation of through holes 50 with a high resolution. For an image device of low resolution, an ordinary thermosetting resin may be used in place of the photosensitive resin. The insulation film 64 is formed by printing, and the through holes 50 are made by the pattern for printing. 66, 68 are the second layer wirings, each consisting of 32 individual wires 70. The second layer wiring 68 is connected, via the through hole row 52, to the substrate wiring lead portion 46, and via the through hole row 58, to the substrate wiring 42. The second layer wiring 66 is to be connected to the substrate wiring 40, and is connected, via the through hole row 54, to the substrate wiring lead portion 46, and via the through hole row 56, to the substrate wiring 40. Each of the second layer wirings 66, 68 is provided on the insulation film 64 and is arranged parallel to the row of arrays 4-1 through 4-40.

FIG. 13 shows a section of the image device. In the diagram, 72 denotes an electrode bump provided on the arrays 4-1 through 4-4. 72 may be, for example, a gold bump. 78 denotes a solder bump provided on the substrate wirings 40, 42. Either 72 or 78 may be a gold bump, and the other is a solder bump. 80 denotes a clip terminal, and connects the common electrodes of the arrays 4-1 through 4-40 to the common electrode terminal 60.

Now the operation of the substrate wirings will be described. Time sharing driving is made for one LED array at a time. As each of the arrays 4-1 through 4-40 has 64 LEDs, the substrate wiring needs 64 wires. In the embodiment, they are divided into substrate wirings 40, 42, 32 wires each. The wiring density is thus reduced to one half. As a result, the substrate wirings 40, 42 can be formed more easily. In the embodiment, through holes 50 and the second layer wirings 66, 68 are also needed consequently. They can be easily realized by the second layer wirings. Flip chip bonding connects the arrays 4-1 through 4-40 to two substrate wirings 40, 42. Hence the actual bonding density is reduced to one half, and flip chip bonding can be made more easily.

In each of the substrate wirings 40, 42, the individual wires are turned back once in the middle. The number of the individual wires for each of the substrate wirings 40, 42, seen along the longitudinal direction of the base plate 2, is 32×2=64. The length of each of the arrays 4-1 through 4-40 is 84.7 $\mu$m×64 or 5.4 mm approx. The length of two arrays is 10.8 mm. Hence the substrate wirings 40, 42 can be realized by, for example, the 50 $\mu$m rule (the wire width and the gap are 50 $\mu$m long each).

One through hole 50 requires a wiring width of 0.5 mm. When 32 through holes 50 are arranged linearly, 16 mm will be needed. In the embodiment, through holes 50 are arranged in four rows and the rows are slanted at 45 degrees. Then the wire width is 0.5 mm×8+1.414 or 2.8 mm. In addition to them, a wiring width of 2.4 mm is required for 24 wires in which no through holes are made. Thus a total of 5.2 mm is required per row. The length of each of the arrays 4-1 through 4-40 is 5.4 mm, and two rows of through hole rows 56 or 58, each having a width of 5.2 mm, are provided per array. Thus wiring with through holes 50 can be made without any difficulty.

Here the clip terminal 80 is used for the treatment of the common electrodes of the arrays 4. Alternately, a second base plate may be provided on the common electrode side of the arrays 4 to sandwich the arrays 4 between two base plates. In this case, the wiring required for the driving of the common electrodes is provided on the second base plate.

Embodiment 2

Figure 14:
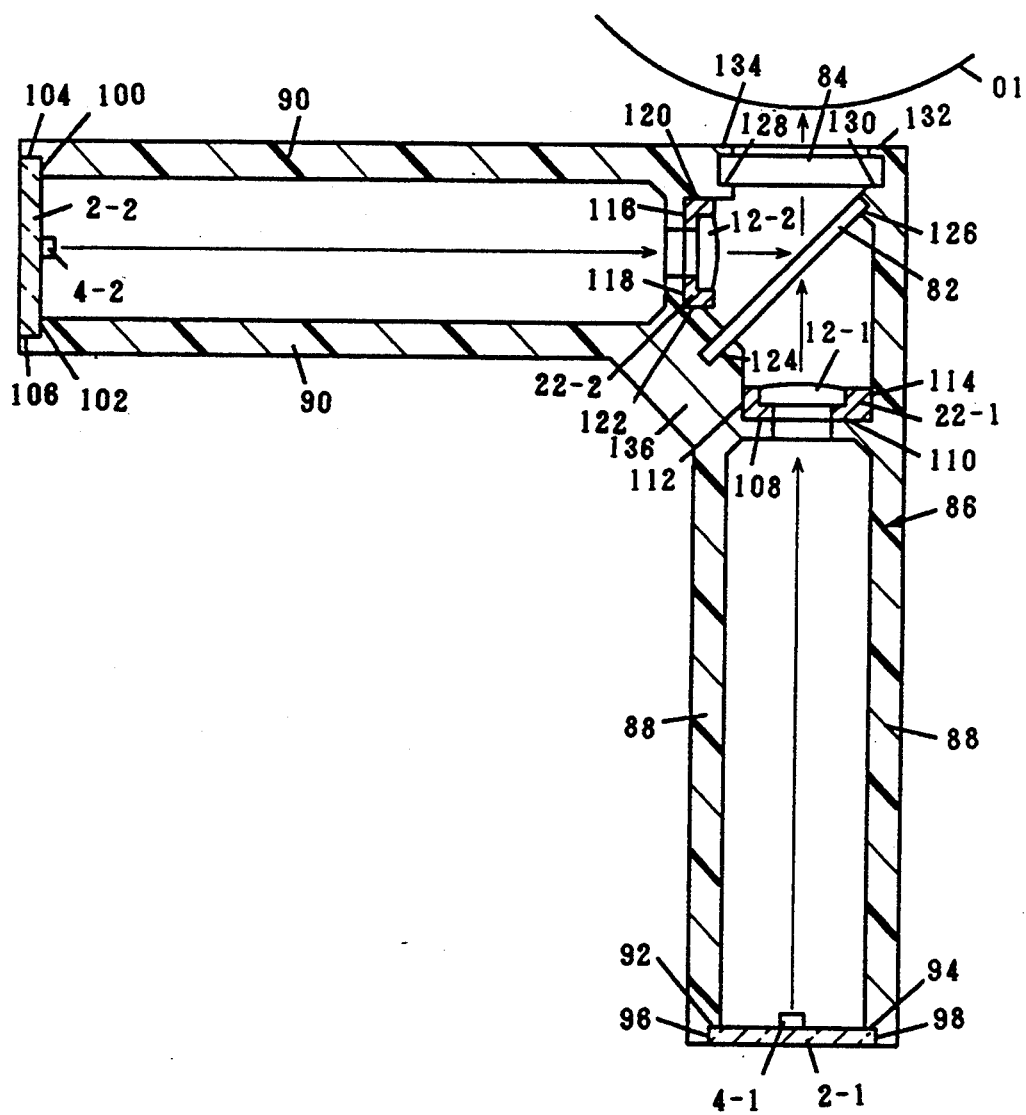
FIG. 14 is a sectional view of an embodiment in which two sets of base plates are used.

FIG. 14 through FIG. 17 show an embodiment in which LED arrays 4 with a resolution of 300 DPI are used to produce an LED head with a resolution of 600 DPI, or LED arrays 4 with a resolution of 300 DPI are used to produce an LED head with a resolution of 1200 DPI. In FIG. 14, 2-1 and 2-2 denote base plates, which carry one row of arrays 4-1 or 4-2 arranged linearly. The arrays 4-1 and the arrays 4-2 have a resolution of 300 DPI, respectively. Light emitting elements are arranged with a pitch of 84.7 μm. The base plates 2-1, 2-2 have substrate wiring of which density corresponds to the resolution of 300 DPI. The base plates 2-1, 2-2 and the arrays 4-1, 4-2 may be those used in any of existing LED heads with a resolution of 300 DPI. The explanation of the embodiment of FIG. 1 through FIG. 13 is applicable to the present embodiment, except otherwise indicated specifically.

12-1 and 12-2 denote single lenses, and are provided on the arrays 4-1, 4-2, respectively. In other words, one array 4-1 or 4-2 is provided with one single lens 12-1 or 12-2, respectively. 22-1 and 22-2 are lens plates, and their coefficients of thermal expansion are virtually identical to those of the base plates 2-1, 2-2, respectively. For instance, the lens plates 22-1, 22-2 may be made with the same material as the base plates 2-1, 2-2 to achieve the same coefficient of thermal expansion for all of them. In the embodiment, one same material is used for the base plates 2-1, 2-2 and the lens plates 22-1, 22-2 to have one identical coefficient of thermal expansion for all members. The lenses 12-1, 12-2 are fixed onto the lens plates 22-1, 22-2, respectively. The lenses 12-1, 12-2 deform according to the coefficients of thermal expansion of the lens plates 22-1, 22-2, respectively. The lenses 12-1, lens plate 22-1, base plate 2-1 and row of LED arrays 4-1 constitute the first image forming unit. The lenses 12-2, lens plate 22-2, base plate 2-2 and row of LED arrays 4-2 constitute the second image forming unit.

82 denotes a half-mirror. It transmits the rays from the lenses 12-1 to form image on the image formation plane 01, and reflects the rays from the lenses 12-2 to form image on the image formation plane 01. 84 denotes optical path adjusting lenses. They are cylindrical lenses, toric lenses or minute convex lenses, and are used in the form of an array. Here the optical path adjusting lenses 84 are cylindrical lenses. The lenses have two flat surfaces as shown in FIG. 4, and their radius of curvature is perpendicular to the plane of FIG. 14. The role of the optical path adjusting lenses 84 is to make the optical paths between the arrays 4-1, 4-2 and the image formation plane 01 more parallel to each other, or literally parallel to each other. The optical path adjusting lenses 84 may be provided, for example, by an array of plastic lenses.

86 denotes a housing made of metal or plastics. The base plates 2-1, 2-2, lens plates 22-1, 22-2, half-mirror 82, optical path adjusting lenses 84 are fitted onto respective reference surfaces of the housing 86 and fixed with an adhesive, etc. Now the positioning of two image forming units of the embodiment will be explained. The row of the LED arrays 4-1 is fixed onto the base plate 2-1 and positioned thereby. The row of the LED arrays 4-2 is fixed onto the base plate 2-2 and positioned thereby. The distance between the base plate 2-1 and the lens plate 22-1 is kept constant by a spacer 88 which is a part of the housing 86. The distance between the base plate 2-2 and the lens plate 22-2 is kept constant by a spacer 90. The top face (the main face on the LED array 4-2 side) of the base plate 2-1 is fitted onto the reference faces 96, 98, and the base plate 2-1 is positioned thereby. Both the side faces of the base plate 2-1 are fitted to the reference faces 96, 98 of the housing 86, respectively, and are positioned thereby. To keep a constant distance from the lens plate 22-1, the reference faces 92, 94 are needed. To align rays from the two image forming units on the image formation plane 01, the reference faces 96, 98 are needed. Similarly, the top face of the base plate 2-2 is positioned by the reference faces 100, 102, and both the side faces thereof are positioned by the reference faces 104, 106. The lenses 12-1 are positioned by the lens plate 22-1. The lower face (on the LED array 4-1 side) of the lens plate 22-1 is positioned by the reference faces 108, 110, and both the side faces thereof are positioned by the reference faces 112, 114 of the housing 86. To keep a constant distance from the base plate 2-1, and to align the rays from two units on the image formation plane 01, the four reference faces 108, 110, 112 and 114 are needed. Similarly, the lenses 12-2 are positioned by the lens plate 22-2, and the lower face of the lens plate 22-2 is positioned by the reference faces 116, 118, and both the side faces thereof are positioned by the reference faces 120, 122. As a result the two image formation units are positioned by the spacers 88, 90 and the respective reference faces of the housing 86.

The half mirror 82 is held, on both the lateral sides, in the grooves 124, 126 made in the housing 86, and positioned by the grooves 124, 126. The optical path adjusting lenses 84 have flat faces in the right-left direction as seen in FIG. 14. The bottom face of the array of the optical path adjusting lenses 84 is positioned by the reference faces 128, 130 of the housing 86. The array of optical path adjusting lenses 84 is held down, from the image formation plane 01 side, by retainers 132, 134 of the housing 86. The retainers 132, 134 are shaped and positioned to suit the surface configurations of the array of optical path adjusting lenses 84.

136 is a reinforcement for preventing the housing 86 from deforming. In the embodiment, the first image forming unit and the second image forming unit are arranged perpendicular to each other, thus the housing 86 is shaped in a letter of L. The spacers 88, 90 form two sides of L and may be deformed. The reinforcement 136 is provided to prevent such a deformation.

The function of the embodiment of FIG. 14 will be described. The rays from the row of LED arrays 4-1 pass through the lenses 12-1. Then the rays are transmitted by the half-mirror 82 to form image on the image formation plane 01. The image is reduced to one half in size. On the other hand, the rays from the row of the LED arrays 4-2 pass through the lenses 12-2. Then the rays are reflected by the half-mirror 82, and the reflected rays form image on the image formation plane 01. The image is reduced to one half in size. The rays from the two units are alternated array to array. Since the images of 300 DPI from two rows are reduced to one half in size and formed in alignment with each other, the synthetic image on the image formation plane 01 has a resolution of 600 DPI.

The first problem is the positioning of each image forming unit. In the embodiment, the housing 86 is used for positioning, and each unit is positioned relative to the housing 86. As a result, the positioning precision is determined by the precision of the housing 86, and the positioning is achieved with a high precision. For instance, the vertical position of the row of LED arrays 4-1, as seen in FIG. 14, is determined by the reference faces 92, 94, and the horizontal positions thereof are determined by the reference faces 96, 98. The positions of the lenses 12-1 are determined by the lens plate 22-1. The vertical position of the lens plate 22-1 is determined by the reference faces 108, 110, and the horizontal position thereof is determined by the reference faces 112, 114. Similarly, the position of the row of LED arrays 4-2, in the vertical and horizontal directions, is determined by the reference faces 100, 102, 104 and 106. The positions of the lenses 12-2, in the vertical and horizontal directions, are determined, via the lens plate 22-2, by the reference faces 116, 118, 120 and 122. The distance between the LED arrays 4-1 and the lenses 12-1 is determined by the spacer 88. The distance between the LED arrays 4-2 and the lenses 12-2 is determined by the spacer 90. The bending deformation of the spacers 88, 90 is prevented by the reinforcement 136. The half-mirror 82 is positioned by the grooves 124, 126, and the array of the optical path adjusting lenses 84 is positioned by means of the reference faces 128, 130 and the retainers 132, 134. As a result, the image forming device can be accurately positioned as a whole, and the rays from the two image forming units can form images on the image formation plane 01 in alignment.

The second problem is thermal expansion which may disturb the positioning of the arrays 4-1, 4-2 and the lenses 12-1, 12-2. In the embodiment, the same material is used for the base plates 2-1, 2-2 and the lens plates 22-1, 22-2 so that all of them have the same coefficient of thermal expansion. As a result, if the base plates 2-1, 2-2 are deformed due to temperature variation, the lens plates 22-1, 22-2 will be deformed at the same rate. Thus the positioning of the row of LED arrays 4-1 relative to the lenses 12-1 will not be disturbed. In a similar way, the positioning of the row of LED arrays 4-2 relative to the lenses 12-2 will not be disturbed.

In the embodiment, the lens plates 22-1. 22-2 are provided separately of the spacers 88, 90, but they may be formed integrally to eliminate the need of positioning the lense plates 22-1, 22-2 relative to the spacers 88, 90 (in the embodiment, the spacers 88, 90 are parts of the housing 86). In that case, positioning is needed for only the base plates 2-1, 2-2, and there is no need of forming the lens plates 22-1, 22-2 separately. Accordingly, the assembly of the image forming device will be simplified.

The functions of the optical path adjusting lenses 84 will be described. If the optical path adjusting lenses 84 are not provided, since the rays from the arrays 4 are contracted to one half and are made to form image by the lenses 12-1, 12-2, when the position of the image formation plane 01 is changed, the size of image of the rays from one LED array will be changed. If the image formation plane 01 is too close, the size reduction will be deficient, and the image from one LED array 4-2 and the image from an adjacent LED array 4-2 will overlap with each other. On the other hand, if the image formation plane 01 is too far away, there will be a gap between the image from one LED array 4-2 and the image from an adjacent LED array 4-2. In both cases, the image quality will be fatally deteriorated. For a printer, for example, this results in black or white streaks. This is because the images are contracted by the lenses 12-1, 12-2.

When the optical path adjusting lenses 84 are provided, the rays from the lenses 84 to the image formation plane 01 will become more parallel to each other. As a result, even if the distance between the image formation plane 01 and the housing 86 is changed, its effects on the images formed will be smaller. In other words, the provision of the optical path adjusting lenses 84 expands the range of tolerance against the variation in distance between the image formation plane 01 and the housing 86.

Figure 15:
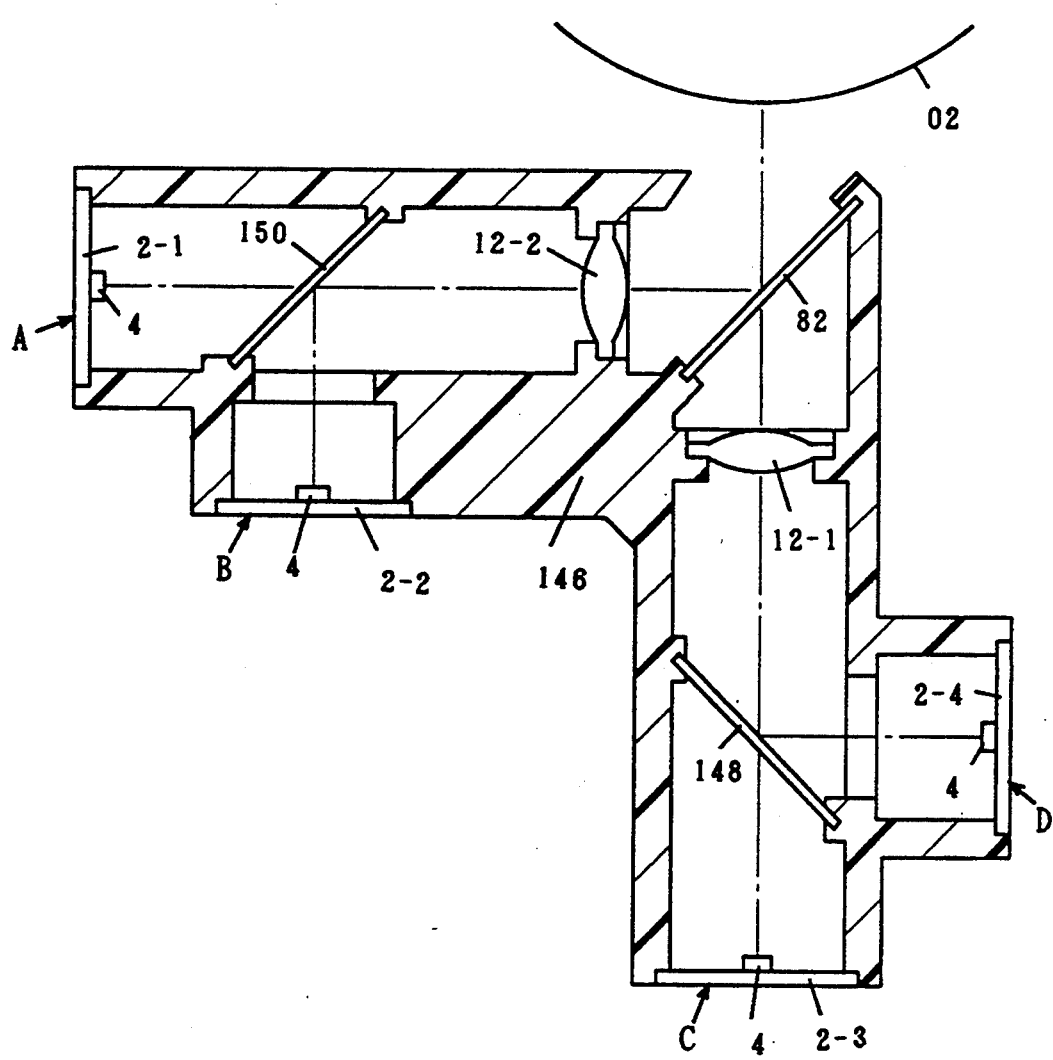
FIG. 15 is a sectional view of an embodiment using four sets of base plates.
Figure 16:
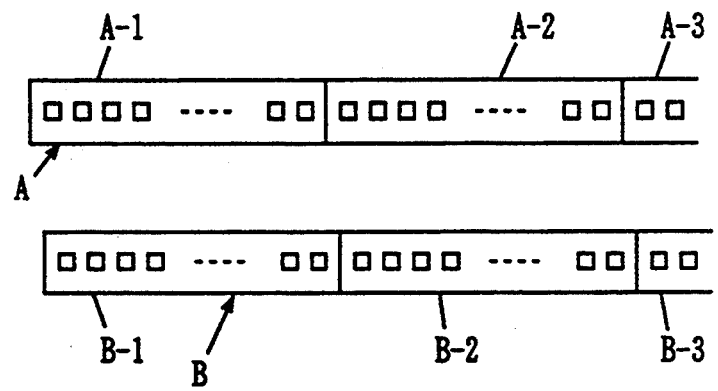
FIG. 16 is a diagram showing the arrangement of two rows of LED arrays in the embodiment of FIG. 15.
Figure 17:
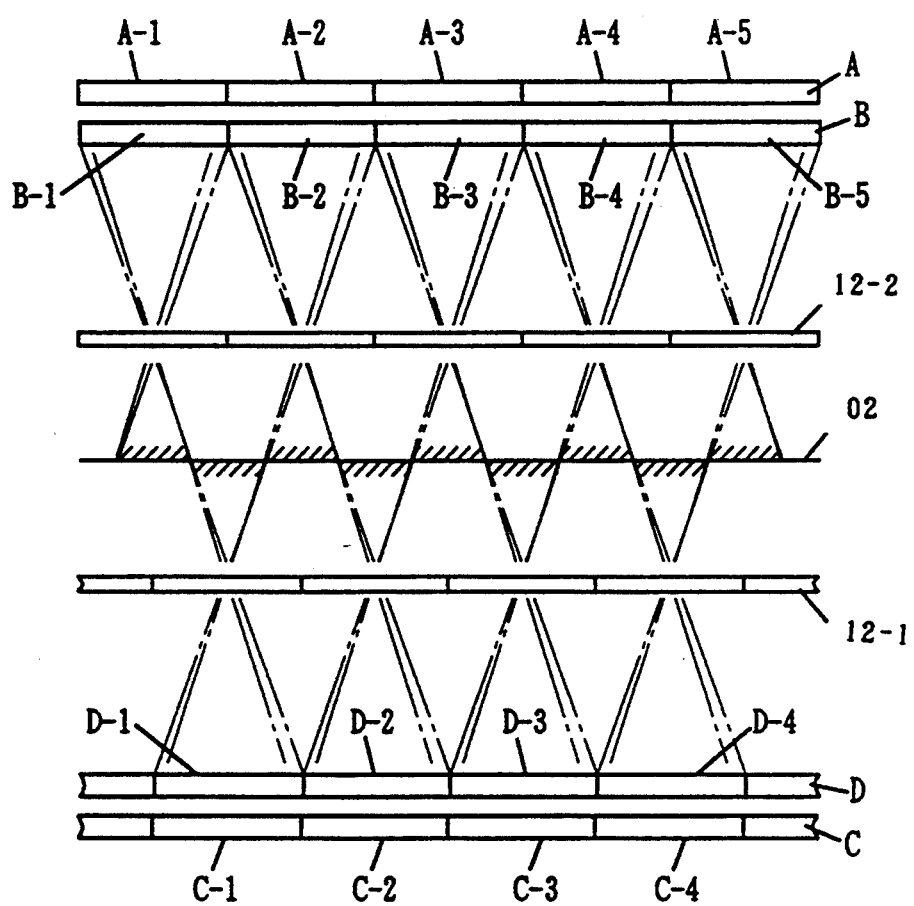
FIG. 17 is a diagram showing the principle of image formation in the embodiment of FIG. 15.

FIG. 15 through FIG. 17 show an modification wherein LED arrays 4 having a resolution of 300 DPI are used to form an image forming device with a resolution of 1,200 DPI. The configuration of this modification is common to that of the embodiment of FIG. 14, except otherwise specified. FIG. 15 shows the optical system of the image forming device. FIG. 16 shows the arrangement of the light emitting elements in the two rows of light emitting elements. FIG. 17 shows the principle of image formation of the image forming device and the allocation of image to the respective light emitting elements.

In FIG. 15, 146 denotes a housing. A housing made of plastics, etc. may be used. 82, 148 and 150 are half-mirrors. The half-mirrors 82, 148 and 150 have the same transmittance and the same reflectivity so that there will be no nonuniformity in the amount of light on the photoconductor drum 02. 12-1 and 12-2 are single lens arrays for reducing image to one half size. When six rows of light emitting elements are used, the reduction rate will be one third. When eight rows of light emitting elements are used, the reduction rate will be one fourth. The reduction rate of the lenses 12-1, 12-2 also depends on whether arrays 4 are arranged closely to each other or loosely at intervals. 2-1, 2-2, 2-3 and 2-4 are base plates. Arrays 4 are linearly arranged with almost no intervals in one row on each of the base plates. In the embodiment, the number of rows of arrays 4 is four, and the number of half-mirrors 82, 148, 150 is three; the number of the half-mirrors is one less than that of the rows of arrays 4. Each row of the lenses 12-1, 12-2 is provided for every two rows of arrays 4. If the number of rows of arrays 4 is $2n$, then n units of single lens arrays will be needed. The image forming device of the embodiment is considered to have four units of LED heads. These imaginary LED heads are called LED heads A, B, C and D.

FIG. 16 shows the layout of the light emitting elements in the LED heads A, B. The light emitting elements of the first LED array B-1 in the head B are shifted from the light emitting elements of the first LED array A-1 in the head A by one half of their layout pitch. In each array 4, the light emitting elements are arranged with a layout pitch for, for example, 300 DPI. There are 64 light emitting elements in one array. Each of the LED heads A, B, C, D has 40 arrays 4. As the layout pitch of the light emitting elements in the array 4 is 84.7 $\mu$m, the light emitting elements of the LED head A and those of the LED head B have to be shifted to each other by 42 $\mu$m. Similarly, the light emitting elements of the LED head C and those of the LED head D have to be shifted to each other by 42 $\mu$m. The rays from the LED heads A, B, C, D are synthesized by the last half-mirror 82 and made to form image on the photoconductor drum 02. Hence it is necessary to arrange the respective light emitting elements with a precision of about $\pm 5$ $\mu$m. To this end, the base plates 2-1, 2-2, 2-3 and 2-4 are provided with markets for mounting the arrays 4. The arrays 4 are mounted by positioning them by means of the markers on the base plates and the markers on the arrays 4. The base plates 2-1, 2-2, 2-3, 2-4 are assembled to the housing 146 with high precision. In this way, it is possible to mount the respective light emitting elements with a precision of $\pm 5$ $\mu$m approx. In the following, the number of the head and the number of the array 4 will be indicated by a mark such as A-2. For instance. A-2 represents the second LED array of the LED head A.

FIG. 17 shows the principle of image formation of the embodiment. The LED head A is shifted relative to the LED head B by one half pitch of the layout of the light emitting elements. Similarly, the LED head C is shifted relative to the LED head C by one half pitch of the layout of the light emitting elements. On the other hand, The LED heads A, B and the LED heads C, D are shifted relative to each other by one half of the length of the array 4. The rays from the LED heads A, B are synthesized by the half-mirror 150 and reduced to one half by the lenses 12-2 to produce an image of 1,200 DPI. This is reflected by the half-mirror 82 and the image is formed on the photoconductor drum 02. Similarly, the rays from the LED head C and the LED head D are synthesized by the half-mirror 148 and reduced to one half by the lenses 12-1, and, via the half mirror 82, made to form image. The image formation area is as indicated by slant lines on the photoconductor drum 02 in FIG. 17. The rays from the lens 12-2 and the rays from the lens 12-1 form image alternately. As a whole, an image of a resolution of 1,200 DPI is formed without any gaps. To the respective single lenses 12-1, 12-2, one array 4 of each head corresponds (a total of two arrays 4, 4 corresponds to one single lens).

Embodiment 3

Figure 18:
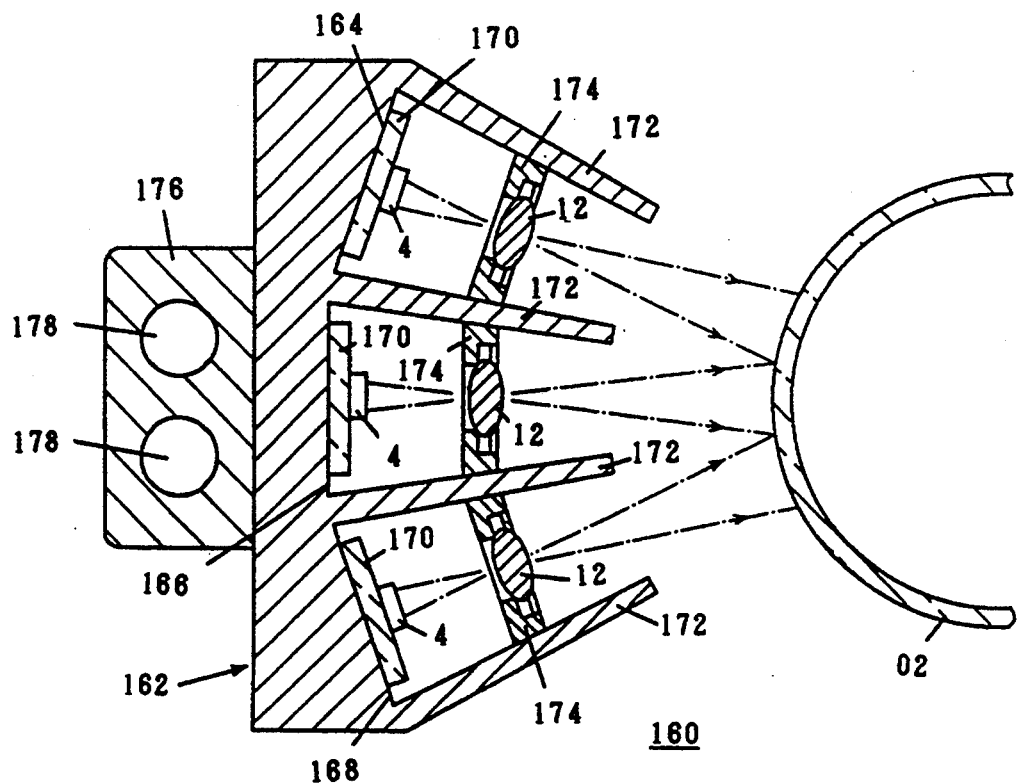
FIG. 18 is a sectional view of an essential portion of an embodiment in which three sets of LED arrays are arranged along the direction of rotation of a photoconductor drum.
Figure 19:
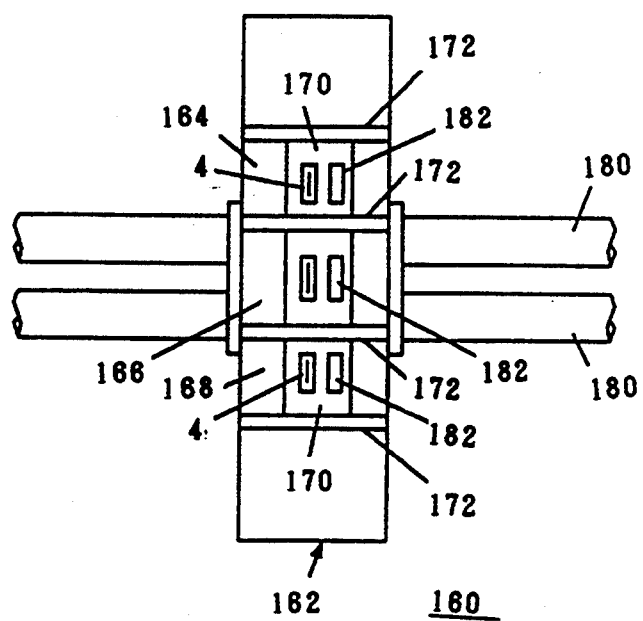
FIG. 19 is a front view of an essential portion of the embodiment of FIG. 18.

FIG. 18 and FIG. 19 show an embodiment of which resolution is lower than that of the LED arrays 4. In this embodiment, the configuration is common to that of the embodiments of FIG. 1 through FIG. 13, except otherwise specified. In FIG. 18, 160 denotes an LED head, and 162 is the housing thereof. 164, 166 and 168 are array mounting faces, and are arranged on a circle concentric to a photoconductor 02. These faces are arranged in such a way that a circle concentric to and greater than the photoconductor drum 02 is approximated by three arcs. 170 denotes a base plate. Here three base plates 170 are used, but any plural base plates will do. In the array 4, a large number of light emitting elements are arranged in one row or in plural rows in the direction of the feed of the photoconductor drum 02. 172 is a side wall and extends towards the center of the photoconductor drum 02. The imaginary extensions of the side walls 172 cross each other at the center of the drum 02. 174 denotes a lens plate and is fixed to the side walls 172. 12 denote a single lens fixed onto the plate 174. The side walls 172 are provided in such a way that each array 4 is isolated from other arrays 4. One lens 12 is provided for one array 4. The lens 12 may be a profile lens or a bar lens. 176 denotes a carriage, and 178 denotes a guide hole.

As shown in FIG. 19, guides 180 are put through the guide holes 178 so that the print head 160 shifts in the direction of the scanning of the photoconductor drum 02. Exposure is made serially in the scanning direction. In the feed direction, exposure is made by the light emitting elements of the three arrays 4, 4, 4 in a parallel manner. If 64 dot×1 row of light emitting elements are provided on an array 4, exposure is made every 192 dots in the feed direction. In the scanning direction, exposure is one dot at a time. 182 denotes a drive IC for the array 4.

Now the characteristics of the LED head 160 will be explained. The guides 180 are used to make the LED head 160 travel in the scanning direction of the drum 02 and make exposure serially. The exposure rate is one dot at a time in the scanning direction. The exposure rate in the feed direction is 64×3 or 192 dots parallel. With the use of plural arrays 4, exposure can be made at a high speed. As the array mounting faces 164, 166, 168 are provided to approximate a circle concentric to the photoconductor drum 02, the respective arrays 4, 4, 4 are located at the same distance from the surface of the photoconductor drum 02. As a magnified image is formed on the photoconductor drum 02 by means of the lenses 12, the arrays 4 can be made smaller, and in turn, at a lower cost. When the arrays 4 are made smaller, even if the surface of each array 4 is flat, the deviation from the arc is smaller, and the distance from the photoconductor drum 2 can be kept more constant.

It is hard to gather the rays from the arrays 4, 4, 4 arranged on the three arcs of the circle concentric to the drum 02 with just one lens to form an image. This will degrade the image forming performance because of the unevenness of the distances from the lens. To avoid it, one lens 12 is arranged for each array 4. Rays from each array are made to form an image with a dedicated lens. The images are synthesized on the drum 02. The lens 12 is mounted on the lens plate 174. Three lenses 12, 12, 12 are positioned on the circle concentric to the drum 02 so that they constitute three identical arcs. The lenses 12, 12, 12 divide the distance between the arrays 4, 4, 4 and the photoconductor film on the surface of the drum 02 at a certain ratio of interior division. As a result of these arrangements, the LED head 160 is accomplished, which can print at high speed and with high exposure precision. The LED head 160 may be stored inside the photoconductor drum 02; the distance between the internal surface of the drum 02 and the head 16 is kept constant as shown in FIG. 9 and FIG. 10.

Embodiment 4

Figure 20:
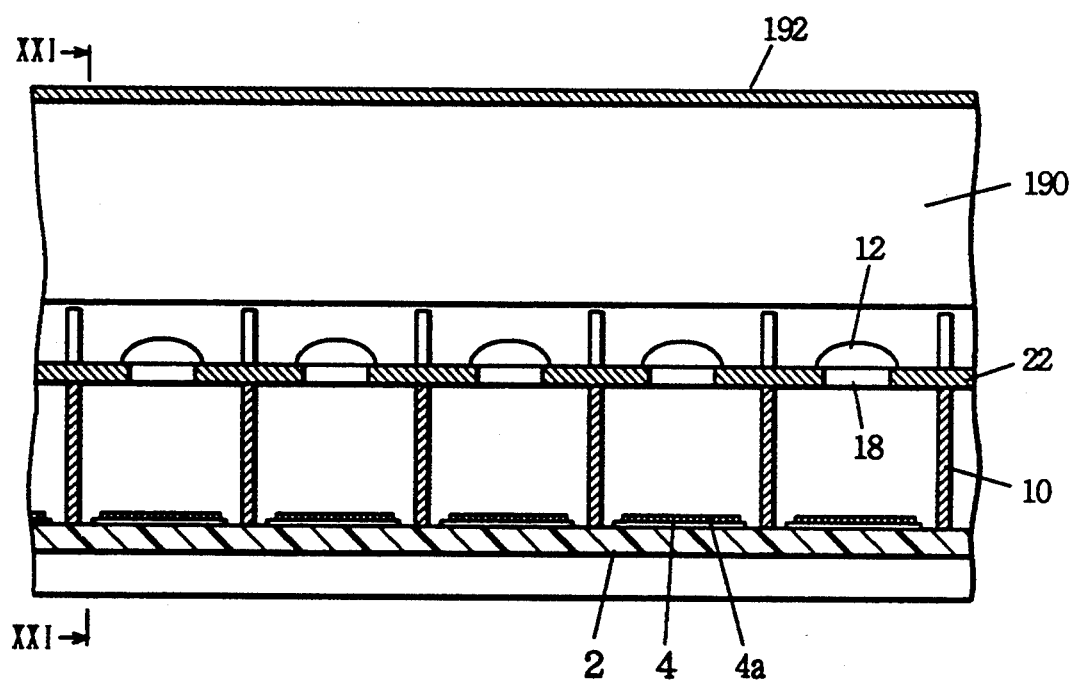
FIG. 20 is a sectional view of an essential portion of another embodiment.
Figure 21:
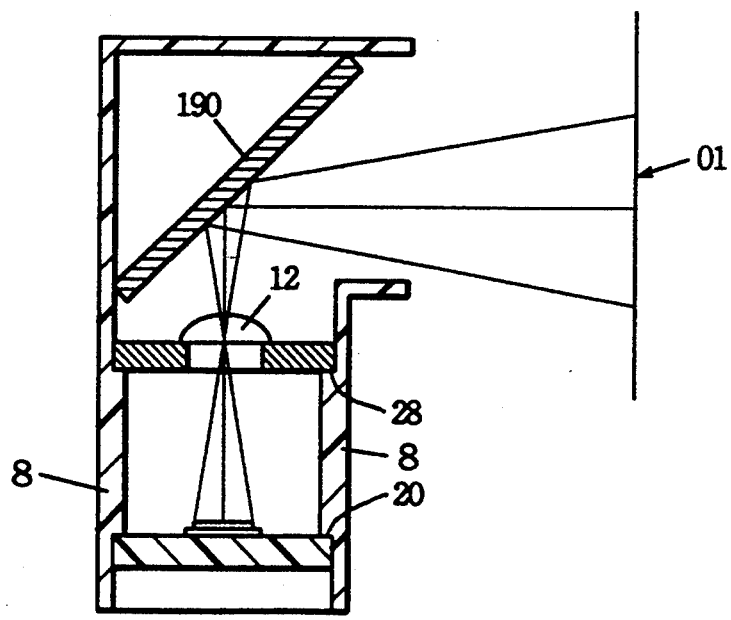
FIG. 21 is a sectional view along the line XXI—XXI of FIG. 20.

It is desirable to make longer the optical path between the LED array 4 and the image formation plane 01. The longer is the optical path, the smaller is the incident angle of the rays to the image formation plane 01. This in turn controls the degrading of the image forming performance due to displacement. FIG. 20 and FIG. 21 show an embodiment in which a mirror 190 is provided in the optical path from the LED arrays 4 to change the optical path. In the diagrams, 190 denotes a reflecting mirror, and 192 denotes a mirror holder. With the use of the mirror 190, the optical path length between the lens 12 and the image formation plane 01 is made longer, and a single lens 12 having a longer focal length is used. The loner is the focal length, the smaller is the degradation of the image quality due to positional changes of the lens 12, array 4, etc. In this embodiment, the mirror 190 is provided between the lens 12 and the image formation plane 01 to have a magnified image. To form a reduced image, the mirror may be provided between the lens 12 and the LED array 41.

I claim:

1. An image device for making rays from image arrays to form an image on an image formation plane, or for making incident rays to form an image on image arrays, said image device comprising;
plural image arrays each of which including plural image elements linearly arranged,
at least one oblong base plate mounting said plural image arrays in a linear arrangement,
at least one oblong lens plate mounting a plurality of single lenses in a linear arrangement, and
an oblong spacer for keeping a constant distance between said base plate and said lens plate, and
wherein the coefficients of thermal expansion of said base plate and of said lens plate are made virtually identical to each other.

2. An image device of claim 1 wherein said image arrays are LED arrays.

3. An image device of claim 1 wherein,
said plural image arrays are mounted on said base plate with a unit of a desired number of said image arrays arranged at intervals, and
said spacer is provided with a pair of side walls fitted onto both longitudinal sides of said base plate, and with shielding plates fitted in said distance.

4. An image device of claim 3 wherein,
said shielding plate has its surface which is provided with roughness for scattering rays in directions differing from an optical path between said image array and said lens.

5. An image device of claim 3 characterized in that said lens plate and said spacer are provided separately, that the side walls of said spacer are fitted onto both of the longitudinal ends of said lens plate, and that said shielding plates are fitted onto a main face of said lens plate on the side of said base plate.

6. An image device of claim 1 characterized in that the coefficients of thermal expansion of said base plate, lens plate and spacer are made virtually the same to each other.

7. An image device of claim 6 characterized in that the difference between any pairs of the coefficients of thermal expansion of said base plate, lens plate and spacer is kept at $3 \times 10^{-6}/°C$. or smaller.

8. An image device of claim 1 characterized in that the coefficient of thermal expansion of said spacer is kept at zero or negative.

9. An image device of claim 1 characterized in that said base plate, lens plate and spacer are comprised of liquid crystalline plastics.

10. An image device of claim 1 characterized in that said base plate, lens plate and spacer are comprised of at least one synthetic resin in a group comprising acrylic resin, methacrylate resin, polycarbonate resin, polyamide resin, polyacetal resin, epoxy resin, ABS resin, polyethylene-terephthalate resin, poly-butylene-terephthalate resin, poly-phenylene-oxide resin, poly-phenylene-sulfide resin and poly-benzimidazole resin.

11. An image device of claim 1 characterized in that said base plate, lens plate and spacer are comprised of crystalline glass.

12. An image device of claim 1 characterized in that said lens plate is provided with lens holding spaces comprising concentric-circle-shaped holes and surrounding annular flanges.

13. An image device of claim 1 characterized in that said lens plate and spacer is comprised of a plastic and wherein the lens plate and the spacer are molded integrally.

14. An image device of claim 1 characterized in that said image arrays are light emitting element arrays, and that optical path adjusting lenses are provided between said lens plate and said image formation plane to adjust an optical path so as to reduce the incident angle of rays from said lenses to the image formation plane.

15. An image device of claim 14 wherein said optical path adjusting lenses are cylindrical lenses or toric lenses.

16. An image device of claim 14 wherein said optical path adjusting lenses are an array of minute lenses.

17. An image device of claim 1 characterized in that said base plate is transparent, and said image arrays are face-down-bonded on a main face of the base plate on a side of the base plate not facing said lens plate.

18. An image device of claim 1 characterized in that said image arrays are light emitting element arrays, said image device is to be stored inside a cylindrical photoconductor, and the image device is provided with a means for keeping a constant distance between the image device and said photoconductor.

19. An image device of claim 1 characterized in that said image arrays are light emitting element arrays, and that said lenses are for contracting rays from the image arrays and making them form an image.

20. An image device of claim 1 characterized in that said image arrays are light emitting element arrays, and that the image device is further provided with at least one mirror for changing an optical path from said light emitting element arrays.

21. An image device of claim 20 characterized in that at least two said base plates are provided, and that a half-mirror is provided to synthesize rays from said two base plates.

22. An image device of claim 20 which is provided with four said base plates and having three said half-mirrors,
wherein, a first half-mirror is for synthesizing rays from a first base plate and rays from a second base plate,
a second half-mirror is for synthesizing rays from a third base plate and rays from a fourth base plate, and
a third half-mirror is for synthesizing rays from the first half-mirror and rays from the second half-mirror.

23. An image device for making rays from light emitting element arrays form images on a photoconductor in a direction of feed thereof comprising:
plural base plates each mounting light emitting element arrays,
plural lens plates each mounting single lenses, and
a spacer for holding each of said base plates and each of said lens plates, for arranging each of said base plates on a line along said feeding direction and at a constant distance from said photoconductor, and for arranging each of said lens plates on a line dividing the distance between said light emitting element arrays and the surface of said photoconductor at a certain ratio of interior division,
and wherein the coefficients of thermal expansion of said base plates and lens plates are made virtually the same.

* * * * *